Aug. 4, 1936.   P. W. LEHMAN ET AL   2,049,587
METHOD AND APPARATUS FOR MAKING COILS
Filed Jan. 15, 1935   7 Sheets-Sheet 1
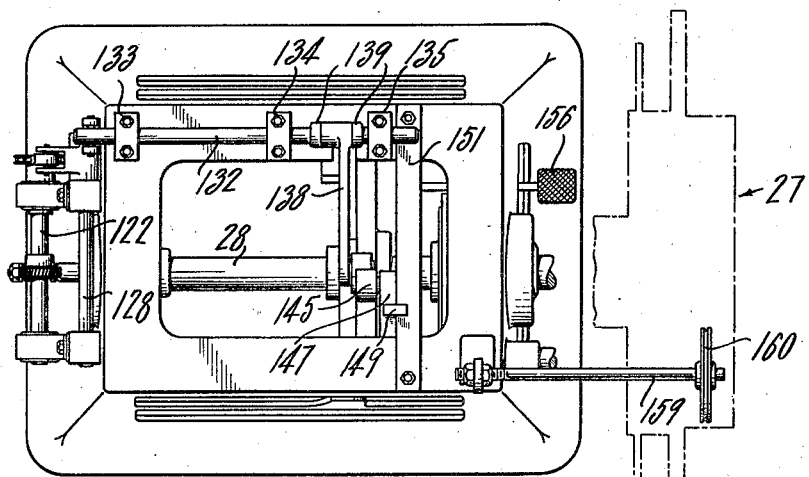
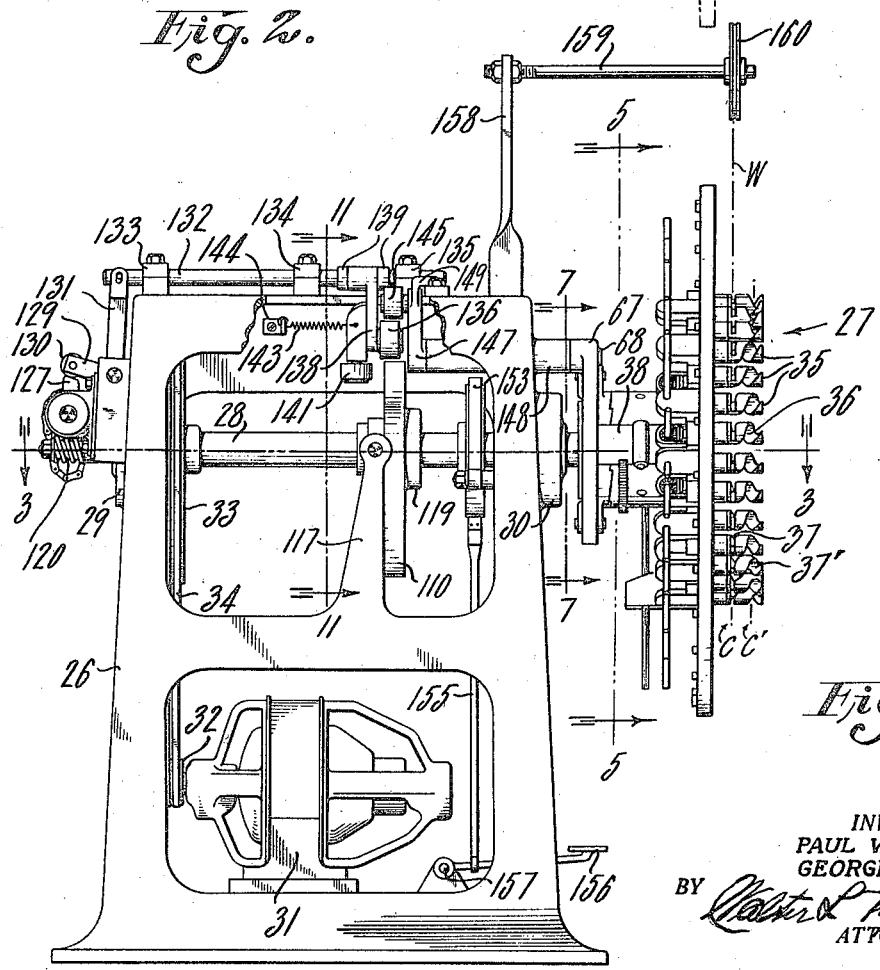
INVENTORS.
PAUL W. LEHMAN
GEORGE F. WIKLE
BY
ATTORNEY.

Aug. 4, 1936.  P. W. LEHMAN ET AL  2,049,587
METHOD AND APPARATUS FOR MAKING COILS
Filed Jan. 15, 1935  7 Sheets-Sheet 3

INVENTORS.
PAUL W. LEHMAN
GEORGE F. WIKLE
BY
ATTORNEY.

Aug. 4, 1936.   P. W. LEHMAN ET AL   2,049,587
METHOD AND APPARATUS FOR MAKING COILS
Filed Jan. 15, 1935   7 Sheets-Sheet 4
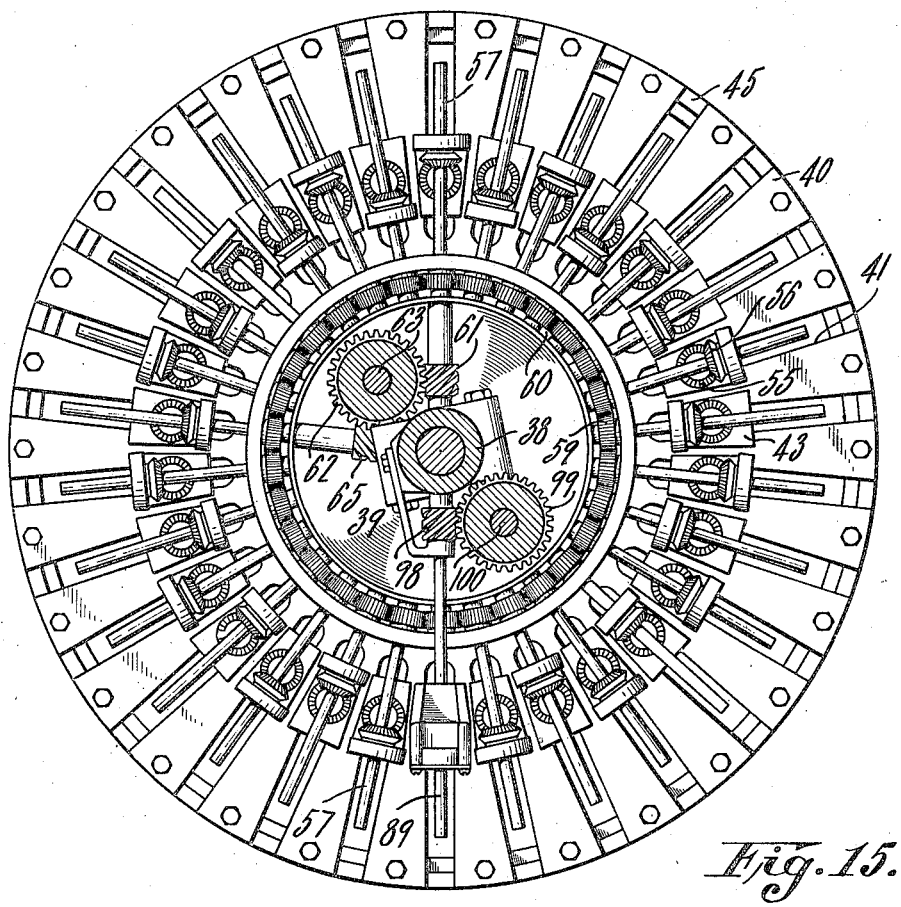
Fig. 5.
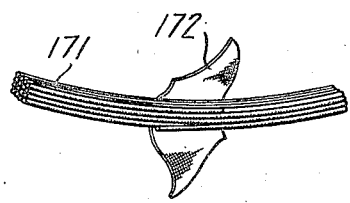
Fig. 16.
Fig. 17.
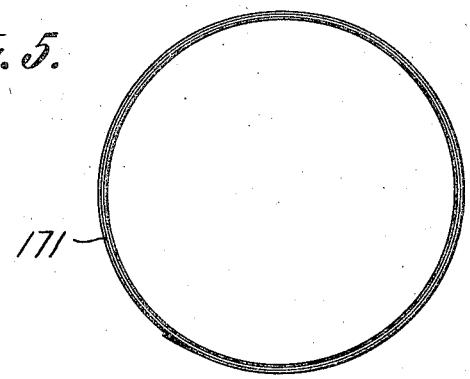
INVENTORS.
PAUL W. LEHMAN
GEORGE F. WIKLE
BY
ATTORNEY.

Aug. 4, 1936.  P. W. LEHMAN ET AL  2,049,587
METHOD AND APPARATUS FOR MAKING COILS
Filed Jan. 15, 1935   7 Sheets-Sheet 5

INVENTORS.
PAUL W. LEHMAN
GEORGE F. WIKLE
ATTORNEY.

INVENTORS.
PAUL W. LEHMAN
GEORGE F. WIKLE
BY
ATTORNEY.

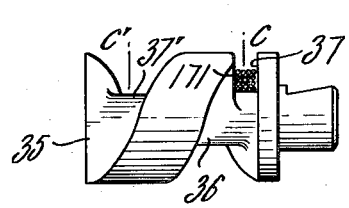
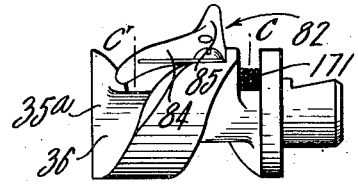
Fig. 18.　　　　Fig. 19.
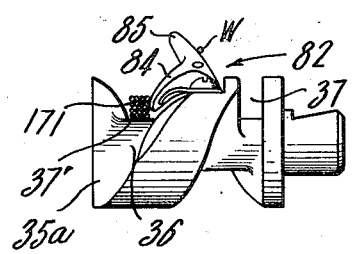
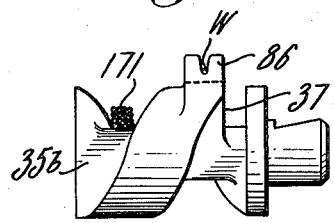
Fig. 20.　　　　Fig. 21.
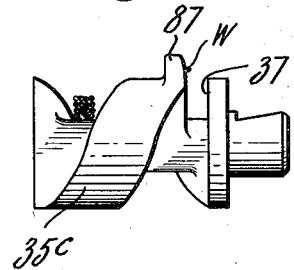
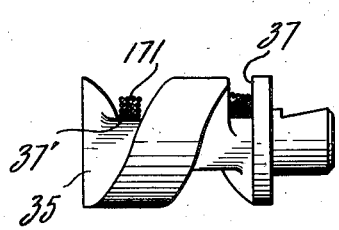
Fig. 22.　　　　Fig. 23.
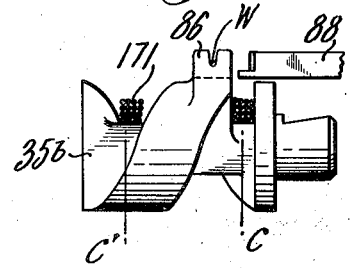
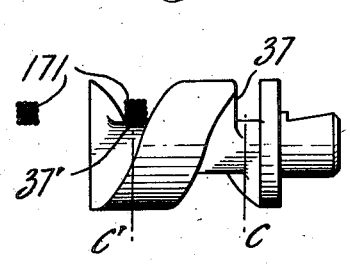
Fig. 24.　　　　Fig. 25.

Patented Aug. 4, 1936

2,049,587

UNITED STATES PATENT OFFICE 2,049,587

METHOD AND APPARATUS FOR MAKING COILS

Paul W. Lehman, Grosse Pointe Park, and George F. Wikle, Detroit, Mich., assignors to United States Rubber Company, New York, N. Y., a corporation of New Jersey Application January 15, 1935, Serial No. 1,892

19 Claims. (Cl. 154—9)

This invention relates to a method and apparatus for making coils having a plurality of convolutions of a flexible element, and particularly to such method and apparatus for making the beads of the type disclosed in U. S. Patent No. 1,981,893 for Pneumatic tires. Generally the invention relates to a method and apparatus for coiling a flexible element or strand, such as a wire, and includes means for performing the operations of cutting the element after the desired number of convolutions have been wound on a winding head and ejecting the coils from the head during its continuous rotation.

An example of the utilization of this invention is found in the manufacture of tire beads for pneumatic tires, in which a wire is coated with a tacky layer of unvulcanized rubber and subsequently wound into an annulus comprising a predetermined number of convolutions of wire. The unvulcanized coating of rubber causes adjacent convolutions of the wire to adhere to one another so that a completed bead annulus forms in effect a unitary, endless cable.

In order to manufacture an annulus of this type, the prior practice included a rotatable head on which single or multiple strand wire is wound into the coil or annulus. When a proper number of convolutions of the wire are wound on the head it has been necessary to stop its rotation, cut the trailing feed wire, eject the coil from the machine, and clamp the end of the wire cut from the coil to the head before its rotation for winding the next coil. The intermittent starting and stopping of the winding head at the beginning and completion of each coil produces a strain upon the mechanism and greatly reduces the rate of production of the coils.

In accordance with the present invention the winding head operates continuously and thereby eliminates the strain and the loss of time caused by the intermittent starting and stopping of the winding head. The continuous operation results in a reduction in the cost of the maintenance of the machine and an increase in the rate of production of coils. Furthermore smoother and quieter operation is obtained and the wire is wound with a more uniform tension. Also, as this machine is continuous it requires no storage devices, such as a festoon mechanism, for supplying the wire to the forming head. These and other objects and advantages will appear more fully in the following detailed description, when considered in connection with the accompanying drawings, in which Fig. 1 is a side elevational view of one form of an embodiment of the invention;

Fig. 2 is a plan view of the machine shown in Fig. 1 in which the winding head is shown broken off and the position of same is shown in dot and dash lines;

Fig. 5 is a rear elevational view of the winding head partly in section, taken along the lines 5—5 of Fig. 1;

Fig. 6 is a cross section of the winding head taken along lines 6—6 of Fig. 4;

Fig. 7 is a sectional view taken along lines 7—7 of Fig. 1 showing the intermittent actuating mechanism for the coil supporting screw conveyor and wire cutting mechanisms;

Figure 3:
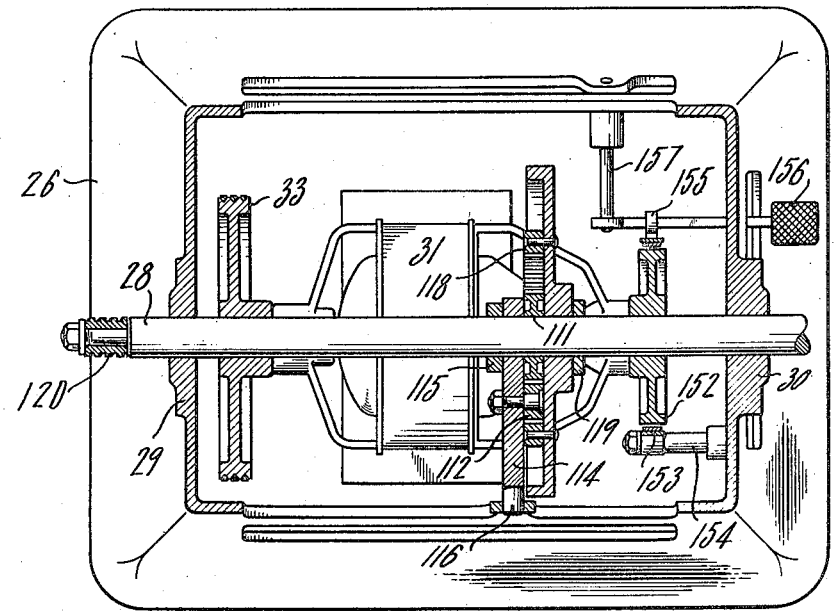
Fig. 3 is a plan view in section taken along lines 3—3 of Fig. 1.
Figure 14:
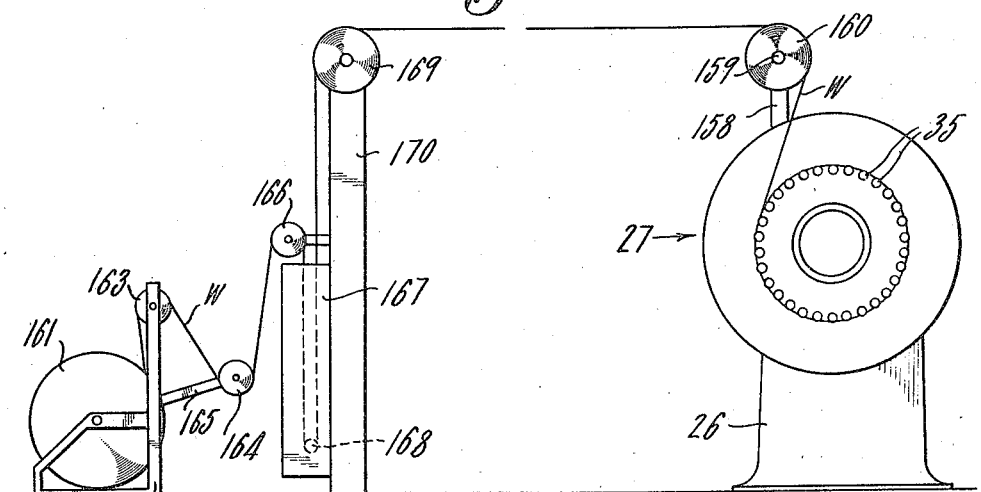
Figure 4:
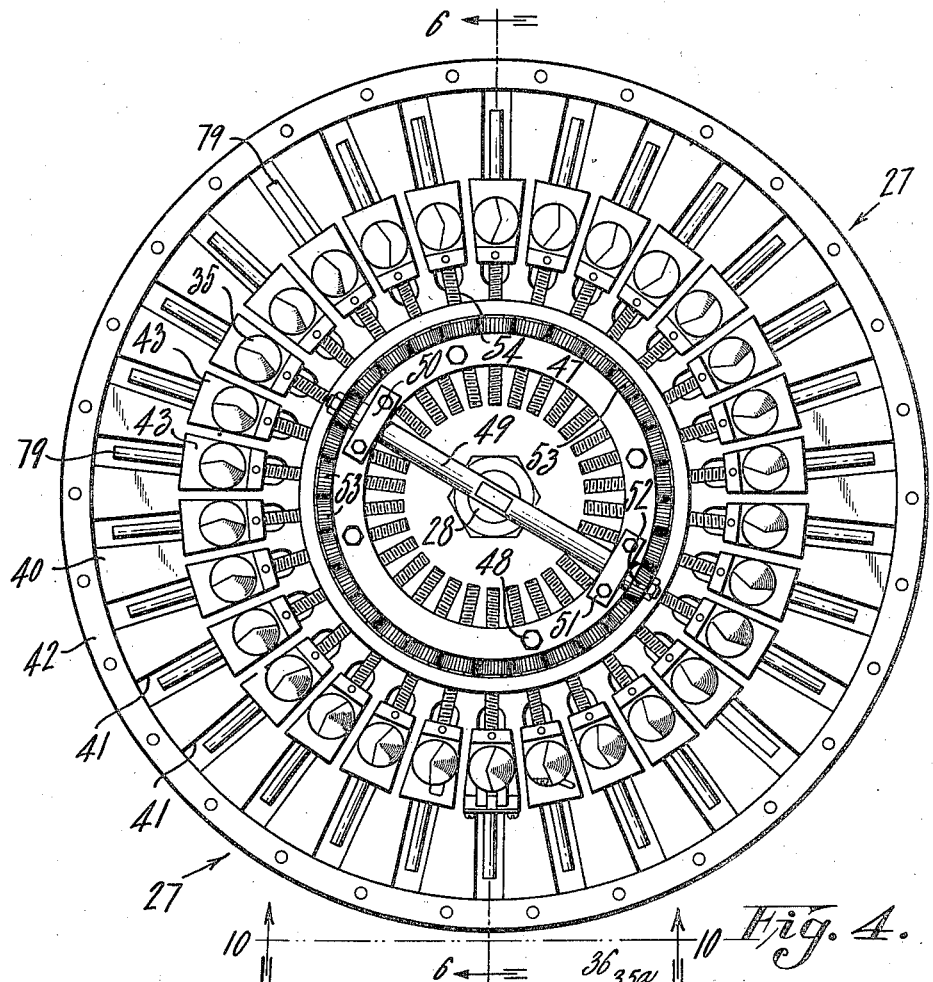
Fig. 4 is a front elevational view of the winding head.
Figure 10:
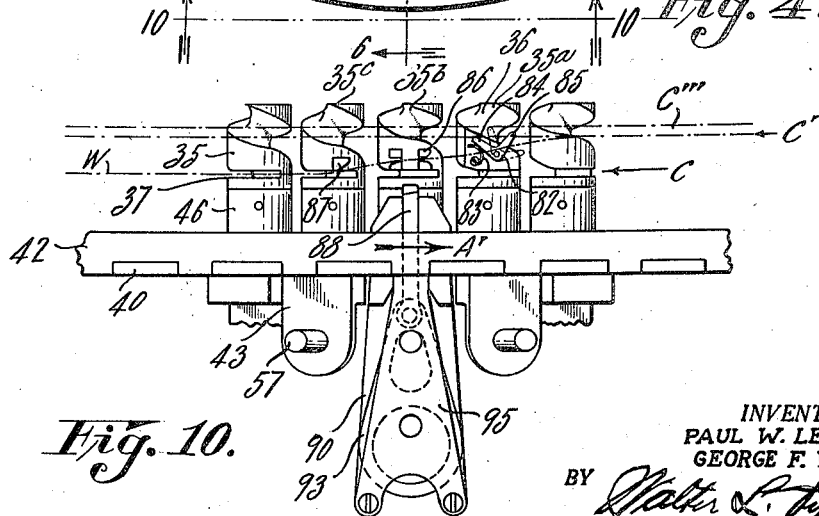
Figures 12, 13:
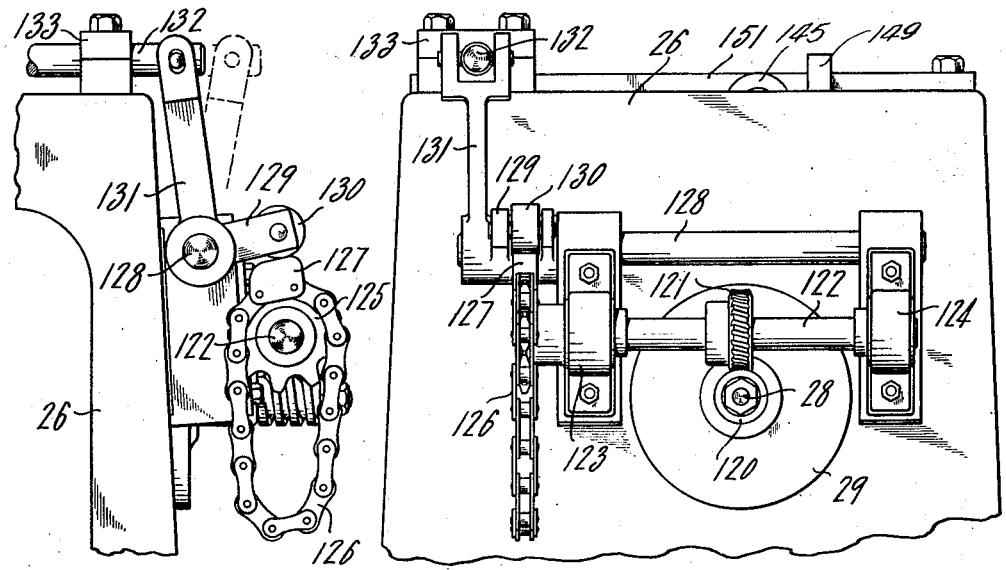
Figure 11:
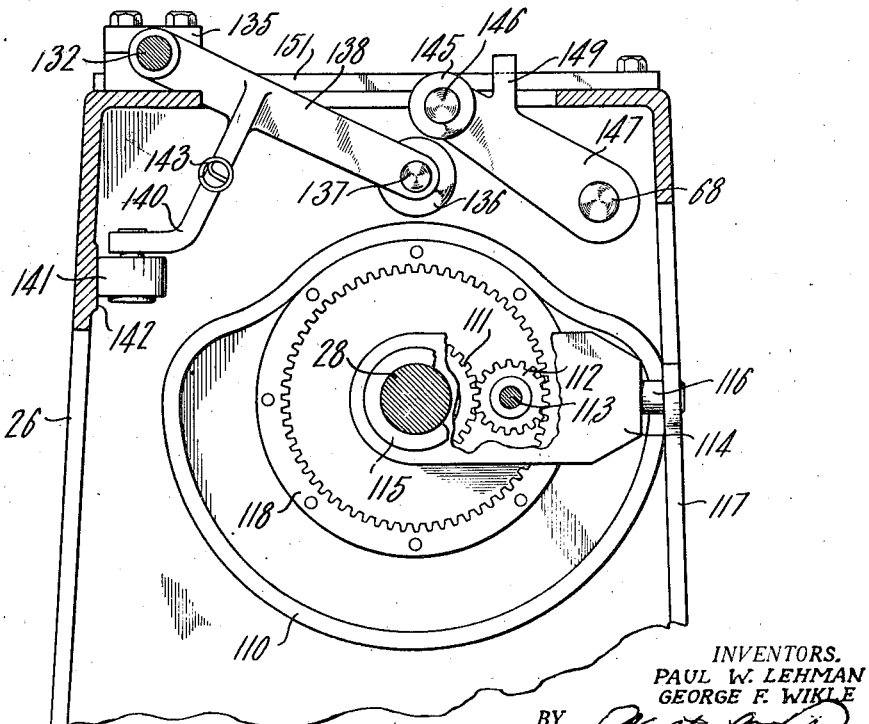

Figs. 8 and 9 are, respectively, cross sectional views of a portion of the mechanism for intermittently actuating the coil supporting screw conveyor and wire cutting mechanisms, taken along the lines 8—8 and 9—9, respectively, in Fig. 7;

Fig. 10 is a view of the wire cutting mechanism, taken along the directional lines 10—10 of Fig. 4;

Fig. 11 is a vertical sectional view taken on the lines 11—11 of Fig. 1;

Fig. 12 is a rear elevational view of a portion of one end of the machine;

Fig. 13 is a side elevational view of the part shown in Fig. 12;

Fig. 14 is a diagrammatic front end elevational view, showing the relation of the wire supplying mechanism to the machine;

Fig. 15 shows a completed coil such as is employed for tire beads;

Fig. 16 is a perspective view showing the wire terminating ends of the bead annulus; and Fig. 17 is a perspective view of a portion of the completed and taped bead annulus; and Figs. 18 to 25 inclusive show side elevational views of the coil supporting screw conveyors, and progressive positions of the coils formed thereon.

Driving mechanism

Referring to Figs. 1 and 2, the embodiment of our invention comprises a main frame 26 which houses driving and timing mechanism for cooperating with a winding head 27. A main drive shaft 28, horizontally disposed and rotatable in bearings 29 and 30, is driven continuously during the operation of the machine by means of an electric motor 31. Pulleys 32 and 33 connected by belts 34 transmit movement from the motor 31 to the shaft 28.

Winding head

Referring to Figs. 1 and 14, the winding head 27 is provided with a plurality of coil forming and supporting conveyor screws 35 which form points on a winding circle upon which a strand of material, such as a wire W shown in dot and dash lines in Figs. 1 and 14 may be wound. The conveyor screws 35 are provided with spiral grooves 36 terminating at their inner end in a coil forming or winding groove 37 and at their outer end in a retaining depression 37'. As the head 27 rotates, the wire W is wound in a coil in the grooves 37 on the winding circle at the position C and after a predetermined number of convolutions of the wire have been formed in a coil, the screw conveyors 35 are rotated and the coil in the position C is shifted to the retaining depression 37' at an outer position C' by the screw action of the spiral grooves 36. During the continued rotation of the head 27, the wire W is trained back into the forming grooves 37 at the position C and successive coils are formed on the conveyor screws 35 in that position. As each coil is formed, the trailing wire W (Fig. 10) connecting the coils C''' is severed and the conveyor screws 35 are intermittently rotated to discharge the coil in the position C' and shift the coil from the position C to the position C'.

Referring in particular to Figs. 6 and 4, the winding head 27 comprises a hub 38 rigidly attached to the shaft 28, and carrying a flange 39 which forms the principal base of the winding mechanism. Attached to the flange 39 is a disc 40 containing a plurality of radial slots 41. A rim 42 joins the outer margin of the disc 40 so as to provide a rigid assembly. A carrier 43 is slidable within each of the radial slots 41 and contains a shaft 45 rotatable therein. Each shaft 45 includes at its face extremity a socket 46 into which a coil supporting screw conveyor 35 is secured. In order to retain the carriers 43 in a definite radial position in the slots 41, means are provided for adjustably anchoring the carriers 43 to a ring 47 which is secured to the flange 39 by means of cap screws 48.

The carriers 43 are adjustable radially in the slots 41 in order to change the diameter of the winding circle formed by the conveyor screws 35 and adapt the head 27 for producing coils of different diameters. The radial adjustment of the carriers 43 is effected simultaneously by the manual rotation of a shaft 49 rotatably mounted in bearings 50 and 51 on ring 47. Each end of the shaft 49 has a bevel gear 52 secured thereto which intermeshes with one of a plurality of intermeshing bevel gears 53. The bevel gears 53 are radially disposed within a recess in the ring 47, and each is provided with a threaded bore which cooperates with one of a plurality of radial threaded rods 54 which extend with clearance through the ring 47. The outer ends of the threaded rods 54 are attached rigidly to the carriers 43. As each adjacent bevel gear 53 rotates in opposite directions, these gears are alternately provided with right and left hand threads and the rods 54 are correspondingly threaded so that upon the rotation of the shaft 49 the carriers 43 will move inwardly and outwardly in the same direction and the winding circle formed by the conveyors 35 will be adjusted to the desired diameter.

Referring to Fig. 6, as the winding head 27 is rotated, the coil supporting conveyor screws 35 are intermittently rotated by miter gears 55 secured to shafts 45 and which mesh with miter gears 56 slidably keyed to radial shafts 57. The outer ends of the shafts 57 are supported by bearings 58 extending from the carriers 43, while the lower ends of these shafts are supported by bearings in the hub 38.

In order that all of the radial shafts 57 will rotate simultaneously, they are joined together by intermeshing bevel gears 59 (Fig. 5) keyed to the shafts 57 and axially retained within a recess 60 in the flange 39. As the intermeshing gears 59 will cause the shafts 57 to rotate alternately in opposite directions, the miter gears 56 are alternately positioned on diametrically opposite sides of the miter gears 55 so that all of the conveyor screws 35 will be rotated simultaneously in the same direction.

A driven worm 61 (Figs. 5 and 6) keyed at the radially inward end of one of the shafts 57 engages with a drive worm 62 affixed to a shaft 63 which is supported at one end by an arm 64 (Fig. 7) extending from the winding head hub 38 and at the opposite end by the flange 39 projecting from the hub 38. The drive worm 62 also meshes with a second driven worm 65 (Fig. 5) keyed to another shaft 57 in order to better distribute the driving movements of the bevel gears 59.

During the rotation of the winding head 27 in the direction indicated by the arrow A in Fig. 7 the drive worm 62 and its associated mechanism including the conveyor screws 35 are intermittently rotated by a roller 66 and a cam arm 67 which cooperate with one another as shown by the dot and dash lines. The cam arm 67 is keyed to a shaft 68 oscillatably mounted in the frame 26 and is intermittently operated by a mechanism to be described which moves the cam arm 67 into and out of the path of rotation of the roller 66.

The roller 66 is mounted on a pin 69 in an arm 70 oscillatably mounted on the drive worm shaft 63. The hub 71 (Fig. 8) of the roller arm 70 is provided with ratchet teeth 72 which cooperate with corresponding teeth 73 on the hub 74 of the drive worm 62. The arm 70 is rotated to its normal or inactive position and the teeth 72 and 73 are normally held in engagement with one another by a coil spring 75 contained in a recess in the hub 71 of the arm. One end of the spring 75 is secured to the hub 71 and the other end of the spring 75 is secured to the arm 64 of the hub 38. The roller arm 70 is held in its normal position against the rotating action of the spring 75 by a resilient stop 76 (Fig. 6) on the hub 38 cooperating with an arm 77 on the roller arm 70.

When the roller arm 70 is moved away from its normal position by the cam arm 67 the ratchet teeth on the roller arm 70 and the hub 74 of the drive worm 62 being in engagement, the worm is rotated through a sufficient angle to rotate the conveyor screws 35 and preferably in the present embodiment the conveyor screws 35 are rotated through a complete revolution.

When the roller 66 runs off the end of the cam arm 67, the roller arm 70 is returned to its normal position by the spring 75 and the drive worm 62 is retained in its position by a spring pressed ball detent 78 which cooperates with equally spaced recesses 79 in the hub 74 of the drive worm 62, one of which falls opposite the ball detent 78 at the end of travel of the drive worm 62 each time it is actuated. The ball 78 is retained in a housing 80 fixed to the winding head hub 38. The housing contains a spring 81 for normally holding the ball 78 in the recesses 79 while the ratchet teeth 72 and 73 on the roller arm 70 and the worm hub 74 slide over one another as the arm is returned to its normal position but yields under the force of the roller against the cam arm.

Referring to Fig. 10, as shown in dot and dash lines a wound coil C''' is shown in its shifted position C' and the feed wire W extending from the shifted coil has been directed back into the forming grooves 37 in the winding position C. For the purpose of leading the wire from the position C' to the position C, a bell crank lever 82 is pivoted on a conveyor screw 35a and is pressed by a spring 83 towards the position indicated by dot and dash lines. The lever 82 is provided with an arm 84 which extends into the spiral depression 36 (Fig. 20) and with an arm 85 which projects upwardly and forwardly towards the front of the head 27. When the coil is shifted into the position C' it contacts with the arm 84 and moves it from the dot and dash position to the full line position and the other arm 85 is extended over the spiral depression 36. The head 27 being rotated in the direction indicated by the arrow A', the feed wire W contacts with the overhanging arm 85 and is deflected thereby towards the position C and is directed between two pairs of projections 86 on a conveyor screw 35b and then by a projection 87 on a conveyor screw 35c back into the winding position C.

After the coil has been wound in the position C and before it is shifted to the position C', the wire W connecting the two coils is severed by a knife 88 which is projected between the projections 86 on the conveyor screw 35b by a mechanism shown particularly in Figs. 5, 6, 7, 9 and 10.

A shaft 89 (Fig. 6) extends from a bearing at the hub 38 radially outward to a bearing in an extension bracket 90 forming a part of a special carrier 91 which in certain features is similar to the remaining carriers 43. The shaft 89 near its outward end carries a cam 92 (Figs. 6 and 10) which operates as an eccentric wheel. This cam 92 is slidably keyed to the shaft 89 so that radial adjustment of the carrier 91 may be readily effected. A link 93 recessed within the extension member 90 of the carrier 91 engages at one end with the cam 92, while at the other end the link 93 is pivotally attached to the knife 88. Plate 95 is attached to the extension member 90 of carrier 91 so as to cover and retain the cam 92 and link 93 in their respective positions. Upon a complete rotation of the shaft 89, a reciprocal movement of the knife 88 is effected by the cam 92 cooperating with the link 93.

At the radially inward end of the shaft 89 (Figs. 5 and 6) a driven worm 98 is keyed. This worm cooperates with a drive worm 99 (Fig. 7) which is rotatable about a shaft 100 supported at one end by an arm 101 extending from and forming a part of the hub 38. The opposite end of the shaft 100 passes through and is supported by the flange 39.

The mechanism for operating the drive worm 99 of the wire cutting mechanism is substantially similar to the mechanism for rotating the screw conveyors 35. Referring to Figs. 6, 7 and 9, briefly, the mechanism comprises a roller 102 adapted to cooperate with the cam arm 67. The roller 102 is mounted on an arm 103 on the shaft 100 and is adapted to actuate the drive worm 99 through the ratchet teeth 104 and spring 105 on the arm 103. A spring pressed ball detent 106 in a housing 107 on the winding head hub 38 is adapted to retain the drive worm 99 in the position moved by the ratchet teeth 104. An arm 108 on the roller arm 103 strikes against a resilient stop 109 on the hub 38 to hold the roller 102 in its normal position against the action of the spring 105.

*Timing mechanism for the coil shifting and wire cutting mechanisms*

The intermittent movement of the coil shifting and wire cutting mechanisms is controlled by the cam arm 67 (Fig. 7) operated by the shaft 68 on which the cam arm 67 is mounted and which in turn is operated by a cam 110 (Fig. 11) located at the opposite end of the shaft 68 and rotatably mounted on the main drive shaft 28. The cam 110 is actuated by a gear 111 keyed to the shaft 28 and which meshes with an idler gear 112 rotatable about a pin 113 extending from an arm 114 in the form of a plate riding on the shaft 28. A collar 115 attached to the shaft 28 operates to retain the arm 114 in its position adjacent to the gear 111. The opposite end of the arm 114 has a projection 116 extending therefrom which engages with a bracket 117 forming a part of the main frame 26. The purpose of the arm 114 is to act merely as a support for the idler gear 112 which transmits movement from the gear 111 to an internal gear 118 attached to the cam 110 which is rotatable about the shaft 28, and is restrained from axial movement by means of a retaining collar 119 (Fig. 1) attached to the shaft 28.

Also associated with the shaft 28 is a worm pinion 120 (Figs. 1–12–13) driven from the rear end of the shaft 28 and which cooperates with a worm gear 121 for driving an auxiliary shaft 122 disposed at right angles to the shaft 28. The auxiliary shaft 122 is supported by bearings 123 and 124 attached to the main frame 26, and drives a sprocket 125 carrying a timing chain 126. A cam 127 forms one of the links of the timing chain 126.

A second shaft 128 parallel to the shaft 122 carries an arm 129 and roller 130 for engagement with the timing chain cam 127. An arm 131 extends at right angular relation from the arm 129, and is provided with a bifurcated end which pivotally engages with a rod 132 slidable in bearings 133, 134 and 135 secured to the upper part of the main frame 26. The cam 127 upon striking the roller 130 produces axial movement of the rod 132. The axial movement in turn carries a cam roller 136 (Fig. 11) in and out of position for engagement with the cam 110. The cam roller 136 is rotatable about a pin 137 secured to one end of an arm 138 pivoted on the rod 132. Collars 139 fixed to the rod 132 (Fig. 2) restrain axial movement of the arm 138 relative to the rod 132. A bracket 140 (Fig. 11) extending from the arm 138 carries a wheel 141 movable along a track 142 forming a part of the frame 26. Thus, the bracket 140 and roller 141 operate to limit the cam roller 136 in its downward movement, so as to provide a clearance between the cam roller 136 and the low portion of the cam 110 in order to permit the roller 136 to be brought into alignment with the cam 110 when opposite such portion. Spring 143 attached to the bracket 140 and attached to a clip 144 extending from the frame 26 normally retains the cam roller 136 out of alignment with the cam 110 so that it cannot be engaged thereby.

A second cam roller 145 in the same plane as the cam 110 is positioned in spaced relation thereto, and is rotatable about a pin 146 extending from an arm 147 keyed to the shaft 68 pivotally rotatable in a bearing 148 (Fig. 1) forming a part of the frame 26. The arm 147 is provided with a projection 149 (Figs. 11 and 12) which overhangs and engages the top of bar 151 attached to the frame 26 and limits the downward movement of the cam roller 145. Thus, a clearance is provided so that the cam roller 136 may be brought into position between the cam roller 145 and the cut away portion of the cam 110; and as the cam 110 rotates the cam roller 136 moves upward, contacting with the cam roller 145 and causing pivotal movement of the shaft 68 which moves the cam arm 67 (Fig. 7) into and out of the path of rotation of the rollers 66 and 102 at the desired time and thereby produces the intermittent operation of the wire cutting and coil shifting mechanisms.

It is sometimes desirable to stop rotation of the machine quickly which may be done by a manually operated brake mechanism which comprises a drum 152 (Figs. 1, 2 and 3) attached to shaft 28, and a brake band 153 attached at one end to a pin 154 extending from the frame 26. The band 153 extends partially around the drum 152, and its opposite end is connected with a rod 155 joining with the foot operated pedal 156, and pivotally connected to the frame 26 through a pin 157.

Wire supplying apparatus

As shown in Figs. 1 and 14, means are provided for guiding the single strand of wire from a source of supply to the winding head 27. This means consists of a bracket 158 attached to and extending from the main frame 26. An extension rod 159 rigidly attached to the bracket 158 supports a sheave 160 which is positioned in alignment with the forming grooves 37 of the conveyor screws 35.

In Fig. 14, a source of wire supply is shown in relative position with the winding machine. As illustrated herein the supply source is a reel 161 of rubber covered wire W, supported by a bracket frame 162. From the reel 161 the rubber covered wire W passes around a sheave 163 and under a pulley 164 supported from a pivoted arm 165. This pivoted arm 165 may cooperate with any type of conventional braking mechanism (not shown) for the purpose of controlling the momentum of the reel 161 according to the speed the wire W is withdrawn therefrom.

As the wire on the reel 161 has a covering of unvulcanized rubber, it is generally necessary to treat the rubber covering with a coating of lubricant such as zinc stearate in order to prevent adhesion of the rubber coating with adjacent convolutions. In the actual formation of a tire bead it is preferable that the rubber covering on the wire is joined by adhesion with adjacent convolutions of the rubber covered wire. Consequently, it is preferable to remove the coating of lubricant from the rubber covered wire W before it is wound on to the winding head. This is accomplished by passing the wire W around a sheave 166 and into a tank 167 containing a fluid such as gasoline for removing the lubricant coating on the wire. Within the tank 167 the wire W passes under a pulley 168 and upward around the sheave 169 supported by a post 170. The wire W is thus positioned in convenient relation with the sheave 160 from whence it is drawn on to the winding head 27.

Fig. 15 shows a tire bead 171 after it is ejected from the winding head 27. This bead annulus consists merely of a number of convolutions of single strand rubber covered wire formed into a unitary annulus by reason of adhesion of the rubber covered wire with adjacent convolutions of the wire.

As shown in Figs. 16 and 17, a piece of rubberized tape 172 is wrapped around a portion of the bead wire so as to hold the loose end strands of wire in group assembly with the remaining convolutions. This operation is performed manually, and is subsequent to the wire coiling operation.

While there is shown one method of supplying rubber covered wire to the winding head, it is to be understood that the wire may be supplied to the head in various other ways; for example, the wire may be covered with a rubber compound as by means of a tuber interposed between a reel of wire and the winding head.

Operation

In the operation of the machine, a single strand of material, and as illustrated herein, a rubber covered wire is brought into alignment with the winding head 27 from a source of supply such as that shown in Fig. 14. In starting the operation, the leading end of the wire W is manually guided into one of the grooves 37 (Fig. 6) of the screw conveyors 35. The end of the wire is then twisted around the screw conveyor to hold same temporarily while the winding head 27 is manually rotated, until one or more convolutions of wire are wound into the groove 37 at the position C. The winding head 27 is then continuously rotated by the motor 31 while the coils or tire beads are formed, having a pre-determined number of convolutions therein which may be controlled by the length of the timing chain 126 (Fig. 13).

During rotation of the winding head the timing chain 126 (Fig. 13) carries the cam 127 into engagement with the cam roller 130 at about the time the proper number of coils of wire are wound into the forming groove 37. Action of the cam 127 causes movement of the arm 131, and moves the rod 132 axially toward the head 27. Also carried with the rod 132 is the arm 138 (Fig. 11) which supports the cam roller 136. The cam 110 rotates rapidly, and almost immediately engages with the cam roller 136, causing it to move upward to contact with the second cam roller 145, thus causing a pivotal movement of the shaft 68. This places the cam arm 67 (Fig. 7) in operative position, and the continuous rotation of the winding head brings the cam roller 102 into engagement with the cam arm 67.

The mechanism associated with the cam roller 102 severs the connecting strand of bead wire by the engagement of the cam roller 102 with the cam arm 67 which causes a complete revolution of the driven worm 98 (Figs. 5 and 6). This movement is transmitted through the shaft 89 to the eccentric cam 92 (Figs. 6 and 10). This cam 92 cooperates to produce a reciprocal movement of the knife 88 which in turn is complementarily associated with the special forming worm 35b. The reciprocal movement of the shearing bar thus severs the strand of wire which is held between the outwardly extending lugs 86 on the conveyor screw 35b. However, during the formation of the first bead annulus the wire cutting mechanism merely goes through the motions of cutting the wire, for as yet no single strand of wire has been positioned between the lugs 86. The cam arm 67 (Fig. 7) still remains in the position as shown by the dotted lines, and cam roller 66 which is diametrically opposed to the cam roller 102 is brought into engagement with the cam arm 67.

During the engagement of the cam roller 66 with the cam arm 67 the arm 70 is carried through a sufficient angle of rotation to cause the conveyor screws 35 to be rotated through a complete revolution and thereby shift the bead annulus 171 from the winding position C to the shifted position C' (Figs. 18 to 25), and discharge the annulus from the position C'. The movement of the cam arm 70 is transmitted to the conveyor screws 35 through the ratchet teeth 72 cooperating with the hub 74 of the worm 62 which rotates the driven worms 61 and 65 keyed to the radially extending shafts 57 carrying the slidably mounted beveled gears 56 which cooperate with the bevel gears 55 on the conveyor screw shafts 45. As the cam roller 66 runs off of the end of the cam arm 67 it is returned to its normal position by the spring 75 and the centrifugal force acting on the arm 70. At about this time, the cam 127 (Fig. 13) on the chain 126 passes from underneath the roller 130 and allows the spring 143 to pull the roller 136 out of alignment with the cam 110 and roller 145. The cam arm 67 then immediately moves outward, due to the weight of the cam roller 145 and arm 147 (Fig. 11) thus allowing the mechanism associated with the winding head to rotate freely until the next cycle of operation.

In Figs. 18 to 25 inclusive, are shown various stages or positions of a bead wire annulus during the cycle of operation.

As shown in Fig. 18, the conveyor screws 35 are provided with a spiral groove 36 terminating in an inner forming or winding groove 37 and an outer retaining recess 37'. The forming grooves 37 are in alignment with the position C in which position, the bead annulus 171 is wound and the retaining recess 37' is in alignment with the position C' into which a bead annulus may be shifted and then retained during the severing operation of the connecting single strand of bead wire extending between the bead annuli in the positions C and C'.

When a proper number of convolutions of bead wire are wound on to the groove 37 to form an assembled bead annulus 171, the conveyor screw 35 is quickly rotated by means hereinbefore described without stopping rotation of the winding head. When the conveyor screw 35 is rotated, the bead annulus 171 is moved along the spiral path from the groove 37 to the recess 37'.

As shown in Fig. 19, one of the special conveyor screws 35a carries the bell crank lever 82, and in Fig. 20 the trip arm 84 which extends into the spiral depression 36 is brought into engagement with the bead annulus 171 during rotary movement of the conveyor screw 35a. The effect of the engagement of the bead annulus 171 with the trip arm 84 is to swing the bell crank lever 82 on its pivot and extend the guide arm 85 over the spiral depression 36 (Figs. 10 and 20) so that it will engage with the feed wire W extending from the completely wound bead annulus 171 and the guide sheave 160. The interposition of the guide arm 85 deflects the wire W toward the forming groove 37.

The next adjacent conveyor screw 35b contains the upstanding lugs 86 between which the connecting wire W is carried as shown in Fig. 21. Again, the next adjacent conveyor screw 35c (Fig. 22) contains an outwardly extending lug 87 which further operates to deflect the wire W into the groove 37. The winding head then continues to rotate until another bead annulus 171 is about completely wound in the groove 37. The conveyor screws now carry two bead wire annuli, one in groove 37 and the other in recess 37' (Fig. 23). However, as shown in Fig. 24, the two bead annuli are connected by the strand of wire W.

As previously stated, the conveyor screw 35b complementarily associates with the knife 88, and at about this time the knife 88 is set into operation, and its reciprocal movement severs the wire W. Directly thereafter the conveyor screws 35 make a complete revolution, and the bead annulus which was retained in the recess 37' is ejected axially from the winding head (Fig. 25), while the bead annulus which was positioned in groove 37 moves axially outward to assume a position in the recess 37'. Thus, a single strand of bead wire is being continuously wound on to the groove 37, and at predetermined periods an assembly of the bead wire convolutions is progressively moved outward, momentarily remaining in the recess 37', and finally ejected from the conveyor screws of the winding head.

Preferably the conveyor screws 35 are rotated about their individual axes so that their peripheries in contact with the wire W move in respect to the ring 42 of the winding head in the direction of its rotation. When the conveyor screws 35 are so rotated the coils 171 are advanced on the head 27 in direction of its rotation. That action has the advantage of causing the cut ends of the wire W to overlap on the circumference of the coil 171, as shown in Fig. 16 which is desirable as it permits every convolution in the tire bead to furnish the greatest degree of inextensibility.

As the tire beads are ejected from the winding head they are caught by an operator; or other means such as a hook or conveyor (not shown) may be employed to receive the beads. The operator next applies a piece of rubberized tape 172 (Fig. 16) transversely around that portion of the bead annulus wherein the ends of the wire terminate. Thus, as shown in Fig. 17, the tire bead is completed and ready for its assembly as a component part of a pneumatic tire.

While a preferred embodiment of this invention is described herein in reference to making coils of rubber coated wire, it will be understood that other materials may be wound into coils by the use of this invention and that modifications of this particular embodiment may be made without departing from the spirit of the invention or the scope of the appended claims.

Having thus described our invention, what we claim and desire to protect by Letters Patent is:

1. In a machine for coiling a flexible element, a continuously rotating winding head for continuously winding the element in close-lying convolutions to form successive coils of several convolutions, each coil on the winding head being connected by the element, means for cutting the connecting element while extending between the coils on said head, and means for successively discharging the coils from the head during its rotation.

2. In a machine for coiling a flexible element such as a wire coated with a tacky material, a continuously rotating winding head, means for successively winding coils on said head from the element in one position, means for shifting said coils in succession on said head from said winding position to a second position on said head and leading the element back to the winding position, means for severing the element connecting said coils while on said head, and means for discharging the coils from said head during the rotation of said head.

3. In a coiling machine a continuously rotating winding head, means for successively winding coils on said head from a continuous flexible element, means for shifting said coils in succession on said head, means for severing the connecting element between the coils after the element has been wound more than one convolution in the coil in its original position, means for actuating said severing means in response to a predetermined number of revolutions of said winding head, and means for discharging the coils from said head during the rotation of said head.

4. In a coiling machine, a continuously rotating winding head, means for successively winding coils on said head from a continuous flexible element and successively shifting said coils from one position on said head to another, means for severing the connecting element between the coils in their original position and the coils in their first shifted position, and means for discharging the coils from said head during the rotation of said head.

5. In a coiling machine a continuously rotating winding head, means for successively winding coils on said head from a continuous flexible element, means for shifting said coils in succession on said head together with the feeding end of the element, means for directing the feeding end of the element from the shifted position to the original position, means for severing the connecting element between the coils in their original position and the coils in their shifted position, and means for discharging said coils during the rotation of said head.

6. In a coiling machine, a rotatable winding head, a plurality of supports projecting from the face of said head and arranged in a circumferential path around the axis of said head, each of said supports having a slot for collectively defining a winding groove and having spiral grooves communicating with each of the slots for forming a path from the slot to the end of the support, and means for rotating the head.

7. In a coiling machine, a rotatable winding head, a plurality of supports projecting from the face of said head and arranged in a circumferential path around the axis of said head, each of said supports having a slot for collectively defining a winding groove and having spiral depressions communicating with each of the slots for forming a path from the slot to the end of the support, said spiral depressions in each support collectively defining a second groove, and means for rotating the head.

8. In a coiling machine, a winding head, a plurality of supports projecting from the face of said head and arranged in a circumferential path around the axis of said head, each of said supports having a slot for collectively defining a winding groove and having spiral grooves communicating with each of the slots for forming a path from the slot to the end of the support, means for simultaneously adjusting each of the supports radially to and from the axis of the head, and means for rotating the head.

9. In a coiling machine, a winding head, a plurality of supports projecting from the face of said head and arranged in a circumferential path around the axis of said head, each of said supports having a slot for collectively defining a winding groove and having spiral grooves communicating with each of the slots for forming a path from the slot to the end of the support, means for rotating the head, means for intermittently rotating said supports and thereby shift the coil from the winding groove to the ends of the supports, and means for severing the last convolution of the coil prior to intermittently rotating said supports.

10. In a coiling machine, a rotatable winding head, a plurality of conveyor screws projecting from the face of said head and arranged around the axis of said head and each having a spiral groove terminating in a circumferential winding groove adapted to receive convolutions of a flexible element, means for winding the element into a coil in said winding groove, means for periodically revolving said screws during the rotation of said head and after a predetermined number of convolutions of the element have been wound into the coil and thereby shift the coil together with the feeding end of the element along said spiral groove of said screws, and means for directing the feeding end of the element back into the winding groove and continuing uninterruptedly the winding of a second coil.

11. In a coiling machine, a rotatable head, a plurality of supports projecting from the face of said head and arranged in a circumferential path around the axis of the head, each of said supports having a recess formed therein for collectively defining a winding groove adapted to receive a flexible element, means for rotating said head and winding a predetermined number of convolutions of said element on said supports in said winding groove to form a coil, and means for intermittently operating said supports during the rotation of said head and in timed relation to a predetermined number of revolutions of said head to shift said coil axially from the circumferential path in which it has been wound and to provide an empty winding groove adapted to receive said flexible element for the formation of a second coil.

12. In a coiling machine, a rotatable head, a plurality of supports projecting from the face of said head and arranged in a circumferential path around the axis of the head, each of said supports having a recess formed therein for collectively defining a winding groove adapted to receive a flexible element, means for rotating said head and winding a predetermined number of convolutions of said element on said supports in said winding groove to form a coil, means for intermittently operating said supports during the rotation of said head and in timed relation to a predetermined number of revolutions of said head to shift said coil axially from the circumferential path in which it has been wound and to provide an empty winding groove adapted to receive said flexible element for the formation of a second coil, means for leading the flexible element into the circumferential path of said empty winding groove, and means positioned on said head and operated in the same cycle of operation immediately prior to the operation of said projections for severing the flexible element crossing over from said shifted coil to said coil in said winding groove.

13. The method of winding coils comprising the steps of continuously feeding a flexible element to a continuously revolving head, winding a coil on the head, shifting the coil to a second position, directing the element from the last convolution on the shifted coil to the original winding position, winding a second coil, severing the connecting strand between the coils, discharging the shifted coil from said head and shifting the second coil to the position of the first coil.

14. The method of winding into coils a flexible element sheathed with a tacky non-metallic material which consists in successively winding the element into coils of a predetermined number of convolutions bound together by said tacky material and completely separating a formed coil from another coil being formed while both coils are on the winding head.

15. The method of winding into coils a flexible element sheathed with a tacky non-metallic material which comprises the steps of successively winding coils connected by the element, severing the connecting element, and discharging the next previously wound coil.

16. The method of continuously forming coils containing a plurality of convolutions of wire separated from one another and embedded in a binder of rubber, comprising the steps of winding a continuous wire having a covering of tacky rubber into a plurality of contacting convolutions to form the coil, separating the feeding strand of covered wire from the coil and forming a second coil and severing the separated strand, and successively discharging the coils.

17. The method of forming coils comprising continuously coiling a flexible element into a plurality of convolutions to form a coil, separating the element from the coil and forming a second coil and severing the separated element and successively discharging the coils after the element has been severed.

18. The method of forming coils comprising continuously coiling the wire into a plurality of convolutions to form a coil, shifting the coil, separating the wire from the coil and forming a second coil, severing the separated wire, shifting the first coil and shifting the last coil into the position of the next preceding coil after the element has been severed.

19. The method of winding coils comprising the steps of continuously feeding a flexible element to a continuously revolving head, winding a coil on the head, shifting the coil to a second position while advancing the coil on the head circumferentially in the direction of rotation of the winding head, directing the element from the last convolution on the shifted coil to the original winding position, winding a second coil, severing the connecting strand between the coils, discharging the shifted coil from said head and shifting the second coil to the position of the first coil.

PAUL W. LEHMAN.
GEORGE F. WIKLE.